United States Patent

Fraleigh

Patent Number: 6,062,744
Date of Patent: May 16, 2000

[54] METHOD AND APPARATUS FOR INDICATING THE EXPOSURE STATUS OF A NON-EXPOSED ROLL OF FILM CONTAINED IN A FILM CANISTER

[76] Inventor: William J. Fraleigh, One Beach Dr. Suite 1607, St. Petersburg, Fla. 33701

[21] Appl. No.: 09/169,867

[22] Filed: Oct. 12, 1998

[51] Int. Cl.[7] .................................................. G03B 17/26
[52] U.S. Cl. .......................................................... 396/515
[58] Field of Search ................................... 396/284, 389, 396/511, 512, 515; 206/578, 316.1, 316.2, 389, 397, 400, 409, 411, 398

[56] References Cited

U.S. PATENT DOCUMENTS

| 3,647,465 | 3/1972 | Shamay | 430/501 |
| 4,505,387 | 3/1985 | Seto | 206/414 |
| 5,032,862 | 7/1991 | Behnke | 396/515 |
| 5,145,065 | 9/1992 | Mizutani et al. | 206/389 |
| 5,213,372 | 5/1993 | Kuo | 206/459.5 X |
| 5,624,033 | 4/1997 | Arai et al. | 206/469 |

Primary Examiner—David M. Gray
Attorney, Agent, or Firm—Zarley, McKee, Thomte, Voorhees & Sease

[57] ABSTRACT

A method for indicating the exposure status of a non-exposed roll of film contained in a film canister with opposite ends having an axially positioned aperture in one end to receive a support bearing of a camera, and an axial positioned slot in the canister with a tail end of the film extending therethrough involves the steps of placing a removable adhesive seal member over the aperture in the canister to prevent the canister from being operatively placed in a camera to indicate to a photographer that the film had not been previously exposed because the presence of the seal would have prevented the canister from being placed in a camera for exposure purposes. An alternate method step is to wrap a removable band around the tail of the film and the canister and releasably securing the band to the canister to indicate to a photographer that the film had not been previously exposed. The apparatus for achieving the aforementioned methods involves the use of a releasable seal on the end of the canister to cover the aforementioned aperture. An alternate form of the apparatus is to wrap a removable band around the tail end of the film and releasably secure it to the canister to remind the user of the film that the film has not yet been exposed.

2 Claims, 2 Drawing Sheets

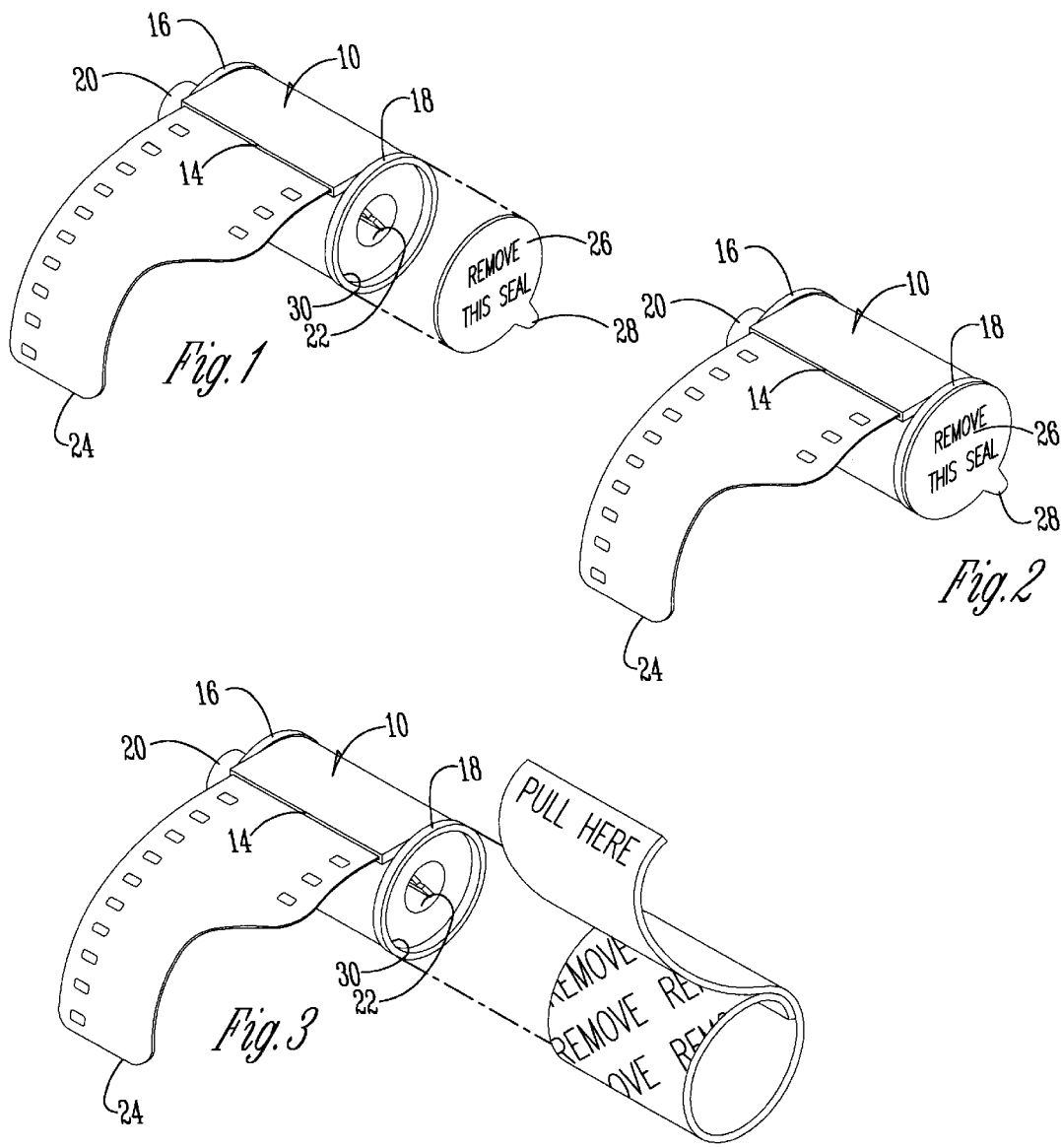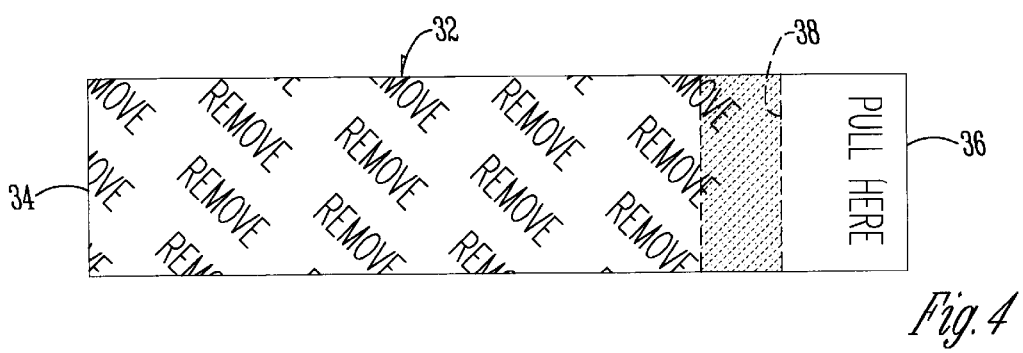

METHOD AND APPARATUS FOR INDICATING THE EXPOSURE STATUS OF A NON-EXPOSED ROLL OF FILM CONTAINED IN A FILM CANISTER

BACKGROUND OF THE INVENTION

A typical 35 millimeter roll of unexposed film is wound in a cylindrical film canister and has a free outer end which protrudes several inches through a slot in the side of the canister. The canister typically will have a small cylindrical tubular bearing extending from one end thereof, and will have a center aperture in the other end to receive a film winding mechanism within the camera. The end of the film which extends through the slot in the canister is usually an indication to most photographers that the film has not yet been exposed. This is because many cameras will automatically rewind the film when all of the exposures on the film have been taken whereupon even the extended end of the unexposed film becomes pulled inwardly through the slot in the canister wherein no portion of the film protrudes upon that series of events.

In spite of these well-known indicators as to whether or not the film in a canister has been exposed, some questions may still arise as to whether a film canister with the free end of the film extending therefrom has actually been exposed.

It is therefore a principal object of this invention to provide an attachment to a conventional canister of unexposed film to clearly indicate to the person examining the canister as to whether or not the film therein has been exposed.

A further object of this invention is to provide an indicator on a canister of film that will indicate the status of its exposure which is inexpensive and easy to recognize and easy to utilize.

These and other objects will be apparent to those skilled in the art.

SUMMARY OF THE INVENTION

A method for indicating the exposure status of a non-exposed roll of film contained in a film canister with opposite ends having an axially positioned aperture in one end to receive a support bearing of a camera, and an axial positioned slot in the canister with a tail end of the film extending therethrough involves the steps of placing a removable adhesive seal member over the aperture in the canister to prevent the canister from being operatively placed in a camera to indicate to a photographer that the film had not been previously exposed because the presence of the seal would have prevented the canister from being placed in a camera for exposure purposes. An alternate method step is to wrap a removable band around the tail of the film and the canister and releasably securing the band to the canister to indicate to a photographer that the film had not been previously exposed.

The apparatus for achieving the aforementioned methods involves the use of a releasable seal on the end of the canister to cover the aforementioned aperture. An alternate form of the apparatus is to wrap a removable band around the tail end of the film and releasably secure it to the canister to remind the user of the film that the film has not yet been exposed.

BRIEF DESCRIPTION OF THE DRAWINGS

FIG. 1 is a perspective view of a conventional roll of unexposed film with the reminder seal that is to be placed on the end of the canister;

FIG. 2 is a perspective view similar to that of FIG. 1 but shows the seal of FIG. 1 in place on the end of the canister;

FIG. 3 is a perspective exploded view of an alternate form of the invention which shows the conventional canister of unexposed film of FIG. 1 and a band member to be wrapped around the circumference of the canister to hold the free end of the film in contact with the canister and to indicate again to the proposed user of the film that the film has not yet been exposed;

FIG. 4 is a plan view of the band shown in FIG. 3; and

DESCRIPTION OF THE PREFERRED EMBODIMENT

Figure 5:
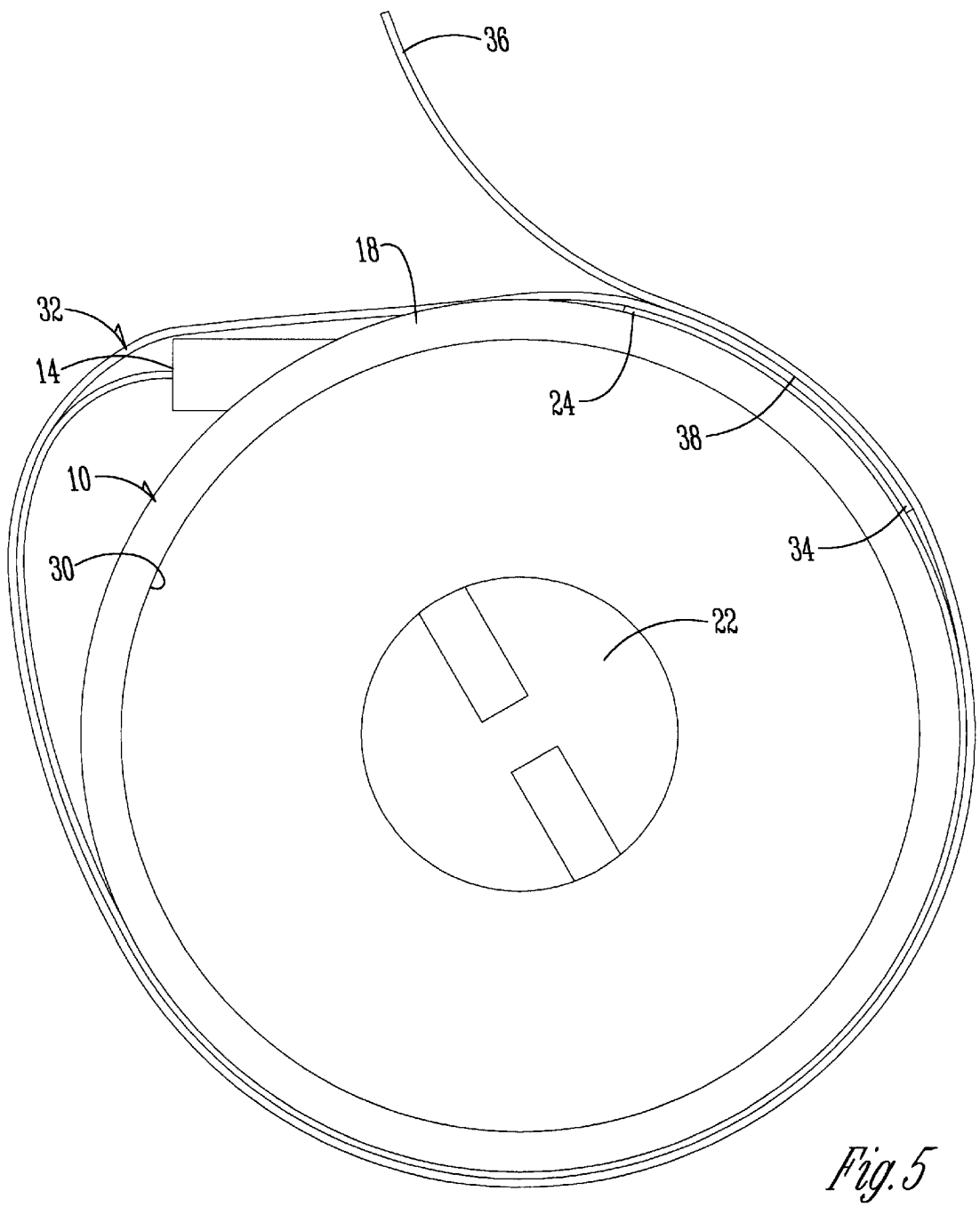
FIG. 5 is an enlarged scale end view of the canister of FIG. 3 with the band mounted thereon.

The numeral 10 designates a conventional cylindrical film canister having a cylindrical wall 12, an axial slot 14, and ends 16 and 18. A tubular bearing member 20 extends outwardly a short distance from end 16. An aperture 22 appears in end 18 along the center axis of a canister and is adapted to receive a winding bearing of a camera. A tail end of the film 24 normally extends outwardly through slot 14 to be attached to the film winding mechanism of the camera.

The foregoing is a description of a conventional film canister containing a roll of unexposed film, with the tail 24 normally being in the position of FIG. 1 for ready attachment and placement within the camera. This structure does not involve the essence of this invention for it is completely conventional.

With reference to FIGS. 1 and 2, a circular seal of paper or plastic has a diameter equal to that of end 18 of canister 10. A tab 28 can appear on the perimeter of seal 26 to facilitate the manual grasping of the seal. The seal 26 has a coating of releasable conventional adhesive on at least the inner periphery thereof so as to releasably affix the seal 26 to the rim 30 on end 18 of the canister 10. This seal is shown to be affixed to end 18 in FIG. 2. With the seal in the position of FIG. 2, the canister 10 cannot be operatively inserted into the conventional camera because the seal covers the aperture 22 and prevents the bearing drive of the camera from being inserted into the aperture 22. This will serve as a reminder to the user of the film that the film has not ever been placed in operative condition within a camera. The operator then grasps the tab 18 and removes the seal 26 from the end of the canister, thereby freeing the canister to be conventionally inserted into a camera for exposure of the film.

An alternate form of the invention is shown in FIGS. 3, 4 and 5. A band of material, such as paper or plastic, having a length of about 5 inches, and a width of an inch or so is designated by the numeral 32. Band 32 has an inner end 34 and a free end 36. A portion of releasable adhesive 38 is placed adjacent the free end 36.

In use, the tail of the film 24 is wrapped around the outer surface of the canister 10. The band 32, which has a length greater than the total circumference of the canister 10, is wrapped around the canister so that the free end 36 extends outwardly from the canister, and the film 24 is held tightly against the outer portion of the canister by the band. The portion of the band having the adhesive 38 forcibly engages and adheres to the band in its overlapped condition. The band serves as a reminder to the film user that the film has not yet been placed in a camera. The band is easily removed by the photographer by grasping the end 36, and pulling the end 36 to disengage the adhesive 38. The removal of band 32 thereupon frees the canister for positioning a camera.

It is therefore seen that the invention will accomplish at least all of its stated objectives.

What is claimed is:

1. A method for loading a film canister into a camera and for indicating the exposure status of a non-exposed roll of film contained in the film canister having opposite ends and having an axially positioned aperture in one end to receive a support bearing in the camera, comprising, placing only one seal member on the canister by placing a removable adhesive seal member on only said one end of said canister over the aperture in said one end to prevent the canister from being operatively placed in a camera to indicate to a photographer that the film had not been previously exposed because the presence of the seal would have prevented the canister from being placed in a camera for exposure purposes, removing the seal member from only said one end of said canister, and placing the canister in the camera after the seal member has been removed from adhesive engagement with said one end of the canister.

2. In combination with a film canister containing a non-exposed roll of film and having opposite ends and an axially positioned aperture in one end to receive a support bearing of a camera, comprising, only one seal member on the canister comprising a removable adhesive seal member mounted only on said one end of said canister having the aperture therein and covering the aperture to prevent the canister from being operatively placed in a camera to prevent penetration of the support bearing into the aperture and thereby to indicate to a photographer that the film had not been previously exposed because the presence of the seal would have prevented the canister from being placed in a camera for exposure purposes, and to permit the canister to be operatively placed in the camera after the seal member has been removed from adhesive engagement with said one end of the canister having the aperture therein.

* * * * *

UNITED STATES PATENT AND TRADEMARK OFFICE
CERTIFICATE OF CORRECTION

PATENT : 6,062,744
DATED : May 16, 2000
INVENTOR(S): William T. Fraleigh

It is certified that error appears in the above-identified patent and that said Letters Patent is hereby corrected as shown below:

Item 75, On the Title page of the patent should read:

Inventor: William T. Fraleigh

Signed and Sealed this

Twentieth Day of March, 2001

*Attest:*

NICHOLAS P. GODICI

*Attesting Officer*     *Acting Director of the United States Patent and Trademark Office*